United States Patent [19]

Smitley

[11] 3,994,358

[45] Nov. 30, 1976

[54] SAFETY SHUT-OFF FUEL SYSTEM

[75] Inventor: Marion L. Smitley, Birmingham, Mich.

[73] Assignee: Colt Industries Operating Corporation, New York, N.Y.

[22] Filed: June 6, 1975

[21] Appl. No.: 584,652

[52] U.S. Cl. .............................. 180/82 R; 137/495; 180/103 BF; 417/295
[51] Int. Cl.² .......................................... B60K 15/08
[58] Field of Search ............ 180/82 R, 103 BF, 104; 123/198 D, 198 DB; 137/38, 39, 494, 495; 417/469, 506, 507, 559, 295

[56] References Cited
UNITED STATES PATENTS

| | | | |
|---|---|---|---|
| 1,262,013 | 4/1918 | Callon | 123/198 DB |
| 1,461,662 | 7/1923 | Kawamura | 123/198 DB |
| 2,212,486 | 8/1940 | Zoder | 123/198 DB |
| 3,001,773 | 9/1961 | Johnson | 417/507 |
| 3,148,671 | 9/1964 | Bottorff | 123/198 DB |
| 3,620,198 | 11/1971 | Breitschwerdt | 123/136 |
| 3,810,489 | 5/1974 | MacManus | 137/495 |

Primary Examiner—M. H. Wood, Jr.
Assistant Examiner—Terrance L. Siemens

[57] ABSTRACT

An automotive fuel system which has a fuel tank, a fuel pump, a fuel metering device for metering fuel flow to an associated fuel-consuming engine, and a fuel reservoir (such as, for example, a carburetor fuel bowl), has a valving assembly interposed generally between the outlet of the fuel tank and the inlet of the fuel pump with such valve assembly being responsive to, for example, the associated vehicle experiencing a crash impact or a roll-over condition whereupon such valving assembly becomes effective to prevent further flow of fuel from the fuel tank into the fuel reservoir.

11 Claims, 2 Drawing Figures

SAFETY SHUT-OFF FUEL SYSTEM

BACKGROUND OF THE INVENTION

Generally, automotive vehicle, whether automobiles, trucks buses or the like, have a relatively high degree of stability even in situations where they are struck from the side by another vehicle at a relatively high velocity. The stability and resistance to such struck vehicle turning over is due to such factors as the relatively heavy weight of the vehicle, its relatively low center of gravity as well as the relatively wide lateral wheel spacing. However, a very small percentage of such automotive vehicles involved in crashes do, nevertheless, turn or roll over or otherwise severely change their attitude from what would be considered normal.

It has, for many years, been accepted practice to, in automotive vehicles, provide a fuel tank from where a fuel pump would draw fuel and in turn supply such fuel to, for example, a fuel metering device on a remotely situated engine.

Often times such fuel metering devices take the form of a carburetor with an associated fuel bowl including a float-valve assembly therein. In many such arrangements there is a vent passage which, in effect, serves to complete communication as between the interior of the fuel bowl (above the fuel contained therein) and a source of ambient atmosphere as, for example, some point or area within and downstream of the engine intake air cleaner.

Of the very small percentage of such automotive vehicles which do turn over, roll over or otherwise severely change their attitude it has been found that a further small percentage thereof have had fuel spill out of the vent tube or passage(or other passages communicating with the engine intake system) and flow over the engine and associated structure. In such instances, after investigations, it has been determined that because of the particular physical attitude or position assumed by the struck vehicle the fuel tank may actually assume an elevation above that of the carburetor fuel bowl. Because of such a change in relative elevations the liquid pressure head of the fuel within the fuel tank becomes sufficient to cause fuel to flow through the fuel pump (even though the fuel pump may not be operating) and into the carburetor fuel bowl from where such fuel, as previously indicated, can spill over onto the engine and associated structure. Such spilled fuel can, in turn, under circumstances giving rise to such a condition, ignite with the resulting flames being capable of starting the entire vehicle to burn.

It has also been determined that upon a barrier crash or impact, the inertia of fuel in the tank creates high and uncontrolled pressure throughout the fuel system causing flooding.

Even though the occurrence of such crash situations leading to such fuel-caused fires is rare, nevertheless, the invention as herein disclosed and described is directed to the solution of such as well as other attendant and related problems.

SUMMARY OF THE INVENTION

According to the invention, an automotive fuel system comprises a fuel tank, a fuel pump for pumping fuel from the tank to an associated fuel metering device which in turn meters fuel to an associated engine, has valving means effective for automatically preventing further fuel flow from the fuel tank to the associated fuel metering device upon the associated vehicle sustaining, for example, a crash impact or a severe change in its attitude as, for example, rolling over.

The invention, is further effective to contain and control enertia fuel pressure created in the tank and fuel lines upon impact, such a barrier crash, so that the only fuel passing to the fuel pump and the fuel metering device is that fuel "called for" by the fuel pump.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and elements may be omitted from one or more views.

DETAILED DESCRIPTION OF THE PREFERRED EMBODIMENT

Figure 1:
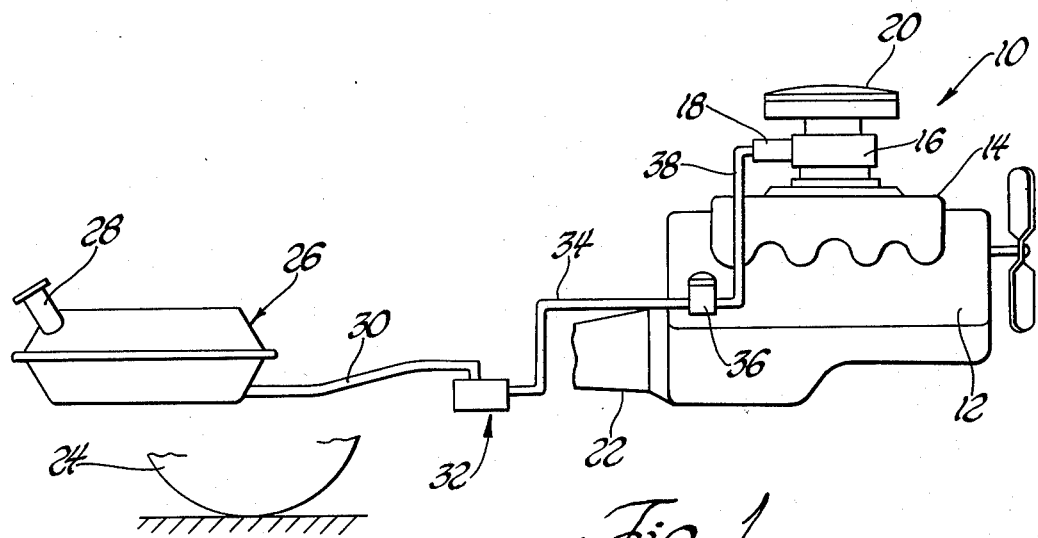
FIG. 1 is a side elevational view depicting the general arrangement of an automobile fuel system employing the teachings of the invention and associated fuel consuming engine.

Referring now in greater detail to the drawings, FIG. 1 illustrates an automotive engine 10 as being comprised of an engine block or housing 12 with an intake manifold 14 and a fuel metering device 16 situated generally thereatop. For purposes of discussion, the fuel metering device 16 may be considered to be a carburetor with an associated fuel reservoir or fuel bowl assembly 18 associated therewith. An air cleaner assembly 20 serves to filter the ambient air being supplied to the intake of the carburetor 16.

A power output transmission assembly 22 may be employed for providing power to the vehicular ground-engaging drive wheels such as fragmentarily illustrated at 24.

A fuel tank assembly 26, usually remotely situated with respect to the engine 10, is provided with a fuel filler pipe or tube 28 and has fuel supply conduit means 30 leading from the tank assembly 26 to the inlet or intake of valving assembly 32. The outlet of valving assembly 32 is connected as by conduit means 34 to the inlet or intake of a related fuel pump assembly 36. The fuel pump assembly 36 may be of any type (many of which are very well known in the art) and may be driven electrically or mechanically as by a direct mechanical connection with the engine assembly 10.

The outlet or discharge of the fuel pump assembly 36 has conduit means 38 leading from there to the inlet of the fuel bowl assembly 18.

Generally, during normal operation, fuel supplied by tank assembly 26 is drawn through valve assembly 32 into pump assembly 36 and thereby pumped into the fuel bowl assembly 18 which may, in turn, employ float actuated and controlled inlet valving means for assuring the admission of only that quantity of pumped fuel as is necessary to maintain a preselected desired level of fuel within such fuel bowl for desired metering characteristics and performance. It should also be mentioned that even though pump assembly 36 is illustrated as being externally of tank assembly 26, such pump assembly, as is also generally well known in the art, may in fact be located internally of the tank assembly.

Figure 2:
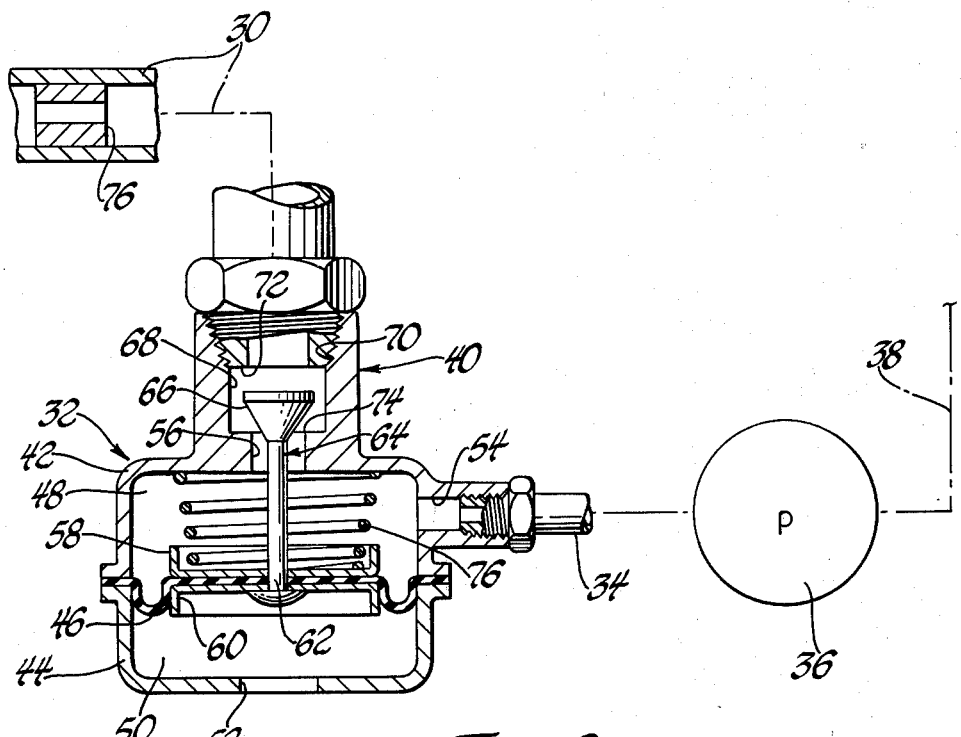
FIG. 2 is a generally axial cross-sectional view, in enlarged scale, of the valve assembly depicted in elevation in FIG. 1 along with schematically and diagrammatically illustrated attendant circuitry and elements.

Referring to FIG. 2, the valving assembly 32 is illustrated as comprising a housing or body 40 having first and second housing sections 42 and 44 which are suitably secured to each other in a manner as to generally peripherally contain and retain therebetween a diaphragm or movable wall member 46 which, in turn, generally defines at opposite sides thereof first and second distinct but variable chambers 48 and 50. As shown, chamber 50 is vented to the ambient atmosphere as by portin or conduit means 52 while chamber 48 is adapted for communication with conduit means 34, as by conduit or passage portion 54, and adapted for at times communicating with conduit means 30 as by conduit or passage portion 56.

Diaphragm backing plates or members 58 and 60 are suitably secured at opposite sides of diaphragm 46 and operatively have connected thereto a stem portion 62 of a valving member 64 provided with a valve surface 66.

Housing section 42 may also be provided with a somewhat enlarged bore 68, threaded as at 70 to threadably receive end 72 of conduit means 30, into which the valving end of valve member 64 generally extends through passage or conduit portion 56. A valve seat 74 is formed generally in bore 68 as to effectively circumscribe passage 56. A spring 76 situated in chamber 48 resiliently urges diaphragm 46, as well as valve member 64, downwardly as to thereby urge valve surface 66 into closed condition against cooperating valve seat 74 to thereby terminate communication and flow of fuel as between bore 68 and passage or conduit portion 56.

Generally, the effective biasing force of spring 76 is of a comparatively low order of magnitude and, preferably, spring 76 is of a comparatively low rate.

OPERATION OF INVENTION

During normal vehicle and engine operation, pump assembly 36 will be supplying fuel to the fuel reservoir 18, as via conduit means 38. In so doing, because of the communication established between chamber 48 and the intake of pump 36 by conduit means 34, chamber 48 becomes exposed to the fuel pump demand and consequently experiences a reduction in pressure therein in response to such fuel pump demands. The reduction in pressure in chamber 48 coupled with the relatively higher pressure of ambient atmosphere chamber 50 results in a pressure differential across diaphragm 46 which, in turn, develops a force of sufficient magnitude to overcome the biasing force of spring 76 and maintain valve portion 66 away from its cooperating valve seat 74 thereby permitting fuel to flow from tank 26, through conduit means 30, into bore 68 and past valve portion 66 into chamber 48 through passage 56. By employing a relatively low rate spring 76 and also pre-loading such spring 76 a slight amount, the opening of valve 66 becomes very sensitive to even a very small reduction in pressure in chamber 48. This provides the added benefit of eliminating the creation of any significant amount of fuel vapor in chamber 48 at any level of pump demand.

In the event that the associated vehicle should experience a high order impact, as might occur in a crash, or rolls over or actually attains or comes to rest in a physical attitude (because of a high order impact) wherein the fuel reservoir 18 is at an elevation below that of the fuel tank assembly, pump demand will effectively cease to exist. Consequently, the pump created pressure differential, previously referred to, across diaphragm 46 also ceases to exist and spring 76 is permitted to move valve portion 66 closed against seat 74 to thereby prevent any further flow of fuel from bore 68 through passage 56 and into chamber 48.

Such termination of fuel flow is maintained even though the liquid static pressure head of the fuel within the fuel tank is relatively high as because of its possible elevation substantially above the valve assembly 32. This becomes evident from an inspection of FIG. 2 wherein it can be seen that any such static presure head, once valve portion 66 is closed, only serves to further apply an additional closing force against valve member 64.

In order to possibly tailor the pressure drop within chamber 48 as to have such pressure drop exhibit certain desired characteristics in relation to pump demand, it is contemplated that restriction means, such as at 76 may be provided generally upstream of the chamber 48. In fact, if such restrictive effect is desired, bore 68 may itself be thusly calibrated or, in the alternative, contain therein separate inserted restriction means.

The valving assembly 32 may, of course, be situated in any suitable location on the associated vehicle. However, generally, the closer that such valve assembly 32 is located to the point or or points of discharge of fuel to the engine 10, the better the overall results would be because if any fuel line effectively between the valve assembly 32 and engine 10 would have a tendency to drain, the volume of such fuel available to so drain would be minimized. Also, it is apparent that valve assembly 32 must be located on the inlet side (upstream) of the fuel pump 36.

Although only a preferred embodiment of the invention has been disclosed and described, it is apparent that other embodiments and modifications of the invention are possible within the scope of the appended claims.

I claim:

1. In a vehicle having a fuel consuming engine, the combination comprising fuel tank means, fuel metering means for metering the rate of flow of said engine, fuel pump means having an inlet and an outlet and effective for supplying a flow of said fuel under a predetermined normal pressure or pressure range from said fuel tank means to said fuel metering means, and pressure responsive safety valving means generally interposed between said fuel within said fuel tank means and said fuel pump means, said safety valving means being effective for at times preventing the flow of said fuel from said fuel tank means to said fuel pump means, said safety valving means comprising housing means, said housing means comprising chamber means, movable pressure responsive wall means defining at least a portion of said chamber means, fuel inlet means formed in said housing means effective for communicating with said chamber means and with said fuel within said fuel tank means, fuel outlet means formed in said housing meams for communicating with said chamber means and an inlet of said fuel pump means, valve member means operatively connected to said movable wall means, and biasing means normally urging said valve member means toward a closed position as to thereby terminate communication as between said inlet means and said chamber means, the effective areas of said valve member and said movable wall and the effective force of said biasing means being such that said valve will open and remain open whenever said fuel pump means is delivering fuel at said predetermined pressure or pressure range and will close and remain closed whenever pump pressure decreases to a value below said predetermined pressure or the minimum pressure of said pressure range, said safety valving means being responsive to pressure and said biasing force alone, and requiring no other forces for operation thereof.

2. The combination according to claim 1 wherein said valving means is situated as to be generally upstream of said fuel pump means and generally downstream of said fuel within said fuel tank means.

3. The combination according to claim 2 wherein said valving means is responsive to the intake pressure of said fuel pump means as well as ambient atmospheric pressure.

4. The combination according to claim 1 wherein said fuel pump means is situated externally of said fuel tank means.

5. The combination according to claim 1 wherein said safety valving means is situated externally of said fuel tank means, and wherein said fuel pump means is situated externally of said fuel tank means.

6. The combination according to claim 1 wherein said fuel metering means comprises carburetor means, wherein said carburetor means comprises fuel bowl means and wherein said fuel bowl means comprises valve-regulated fuel bowl inlet means.

7. The combination according to claim 1 wherein said movable wall comprises a pressure responsive diaphragm.

8. The combination according to claim 1 wherein said biasing means comprises spring means.

9. The combination according to claim 1 wherein said movable wall means comprises pressure responsive diaphragm means, and wherein said biasing means comprises spring means situated generally in said chamber means and operatively engaging said valve member means.

10. In a vehicle having a fuel consuming engine, the combination comprising fuel tank means, fuel metering means for metering the rate of flow of said fuel to said engine, fuel pump means having an inlet and an outlet and effective for supplying a flow of said fuel from said fuel tank means to said fuel metering means and pressure responsive safety valving means generally interposed between said fuel within said fuel tank means and said fuel pump means and being effective for at times preventing the flow of said fuel from said fuel tank means to said fuel pump means, said safety valving means comprising housing means, said housing means comprising chamber means, movable pressure responsive wall means defining at least a portion of said chamber means, fuel inlet means formed in said housing means effective for communication with said chamber means and with said fuel within said fuel tank means, fuel outlet means formed in said housing means for communicating with said chamber means and said inlet of said fuel pump means, valve member means operatively connected to said movable wall means, and biasing means normally urging said valve member means toward a closed position as to thereby terminate communication as between said inlet means and said chamber means and calibrated restriction means generally downstream of said fuel tank means and upstream of said inlet means of said valving means.

11. In a vehicle having a fuel consuming engine, the combination comprising fuel tank means, fuel metering means for metering the rate of flow of said fuel to said engine, fuel pump means having an inlet and an outlet and effective for supplying a flow of said fuel from said fuel tank means to said fuel metering means, and pressure responsive safety valving means generally interposed between said fuel within said fuel tank means and said fuel pump means and being effective for at times preventing the flow of said fuel from said fuel tank means to said fuel pump means, said safety valving means comprising housing means, said housing means comprising chamber means, movable pressure responsive wall means defining at least a portion of said chamber means, fuel inlet means formed in said housing means effective for communicating with said chamber means and with said fuel within said fuel tank means, fuel outlet means formed in said housing means for communicating with said chamber means and said inlet of said fuel pump means, valve member means operatively connected to said movable wall means, and biasing means normally urging said valve member means toward a closed position as to thereby terminate communication as between said inlet means and said chamber means, said movable wall means comprising pressure responsive diaphragm means said biasing means comprising spring means situated generally in said chamber means and operatively engaging said valve member means, and calibrated restriction means generally downstream of said fuel within said fuel tank means and upstream of said inlet means of said valving means.

* * * * *